(12) United States Patent
Lasko et al.

(10) Patent No.: US 8,128,524 B2
(45) Date of Patent: Mar. 6, 2012

(54) SHEATH ASSEMBLY FOR A PLANETARY GEAR

(75) Inventors: Rick T. Lasko, Homer Glen, IL (US);
Daniel J. Reed, Brimfield, IL (US);
Timothy F. Nusz, Wyoming, IL (US);
Christopher P. Braet, Peoria, IL (US);
Keith A. Kabrick, Springfield, IL (US);
John D. Zeirke, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 695 days.

(21) Appl. No.: 12/261,394

(22) Filed: Oct. 30, 2008

(65) Prior Publication Data

US 2010/0113205 A1    May 6, 2010

(51) Int. Cl.
*F16H 57/04* (2010.01)

(52) U.S. Cl. .................................. 475/159; 475/161

(58) Field of Classification Search .................. None
See application file for complete search history.

(56) References Cited

U.S. PATENT DOCUMENTS

| | | | | |
|---|---|---|---|---|
| 4,157,668 A | * | 6/1979 | Fukuma et al. | 475/159 |
| 4,573,373 A | * | 3/1986 | Shimizu et al. | 74/468 |
| 5,851,163 A | * | 12/1998 | Kawase et al. | 475/183 |
| 6,039,667 A | * | 3/2000 | Schunck et al. | 475/159 |
| 7,341,539 B2 | * | 3/2008 | Huber et al. | 475/331 |
| 2009/0291797 A1 | * | 11/2009 | Ai et al. | 475/183 |

* cited by examiner

*Primary Examiner* — Justin Holmes
*Assistant Examiner* — Jacob S Scott

(57) ABSTRACT

A gear train assembly includes a planetary gear set partially submerged in an oil bath and having a plurality of planetary gears mounted on a rotatable carrier. A plurality of sheaths having a hydrodynamic profile are mounted on the carrier to reduce the churning and turbulence created by the planetary gears as they enter the oil bath.

20 Claims, 6 Drawing Sheets

SHEATH ASSEMBLY FOR A PLANETARY GEAR

TECHNICAL FIELD

The present disclosure relates generally to a gear train assembly for a machine, and more particularly to a gear train assembly including a sheath covering a portion of a planetary gear.

BACKGROUND

Various machines, such as mining trucks, are known to employ drive propulsion systems to propel or retard the machine, such as a mechanical drive or an electric drive. An electric drive propulsion system, for example, generally includes an alternator, or other electrical power generator, driven by an internal combustion engine. The alternator, in turn, supplies electrical power to one or more electric drive motors connected to wheels of the machine. The motors are generally connected to the wheels by way of a final drive assembly that reduces the rotational speed of the motor. The final drive of a machine may employ one or more planetary gear sets to reduce the output speed of the propulsion system. Such planetary gear sets may be partially submerged in an oil bath for cooling and/or lubrication. At high rotational speeds, turbulence and churning created in such oil baths may contribute to the loss of energy and/or the generation of heat.

Some gear train assemblies attempt to reduce turbulence and churning by providing a stationary shroud that fits closely to the gears and fully encloses the sides and outer diameters of meshing gears. For example, U.S. Pat. No. 5,048,370 (the "'370 Patent") teaches a shroud for enclosing several gears within a gear train. The shroud taught in the '370 Patent includes an input and output port for injection and ejection, respectively, of cooling fluid. However, a close fitting, stationary shroud may not be an effective or feasible solution for reducing turbulence created by large planetary gears that are used in the powertrain of many machines, particularly planetary gear sets having rotating carriers that are partially submerged in an oil bath.

SUMMARY OF THE DISCLOSURE

In one aspect, a gear train assembly is disclosed that is lubricated by oil and includes a carrier rotatable about an axis, a planetary gear rotatably coupled to the carrier, and a sheath coupled to the carrier and covering a portion of the planetary gear. According to the disclosure, the sheath has an outer surface having a first end disposed proximate to the carrier and away from the planetary gear, and a second end disposed proximate to the planetary gear and away from the carrier.

In another aspect, a method of reducing turbulence generated by a planetary gear set partially submerged in an oil bath is disclosed. This method includes the steps of providing a carrier rotatable in a primary direction about an axis, providing a plurality of planetary gears rotatably coupled to the carrier, providing a plurality of sheaths coupled to the carrier, each sheath partially covering one of the plurality of planetary gears, and rotating the carrier in the primary direction, wherein as the carrier rotates in the primary direction, for each full rotation of the carrier, each sheath leads its respective planetary gear into the oil bath.

DETAILED DESCRIPTION

Figure 1:
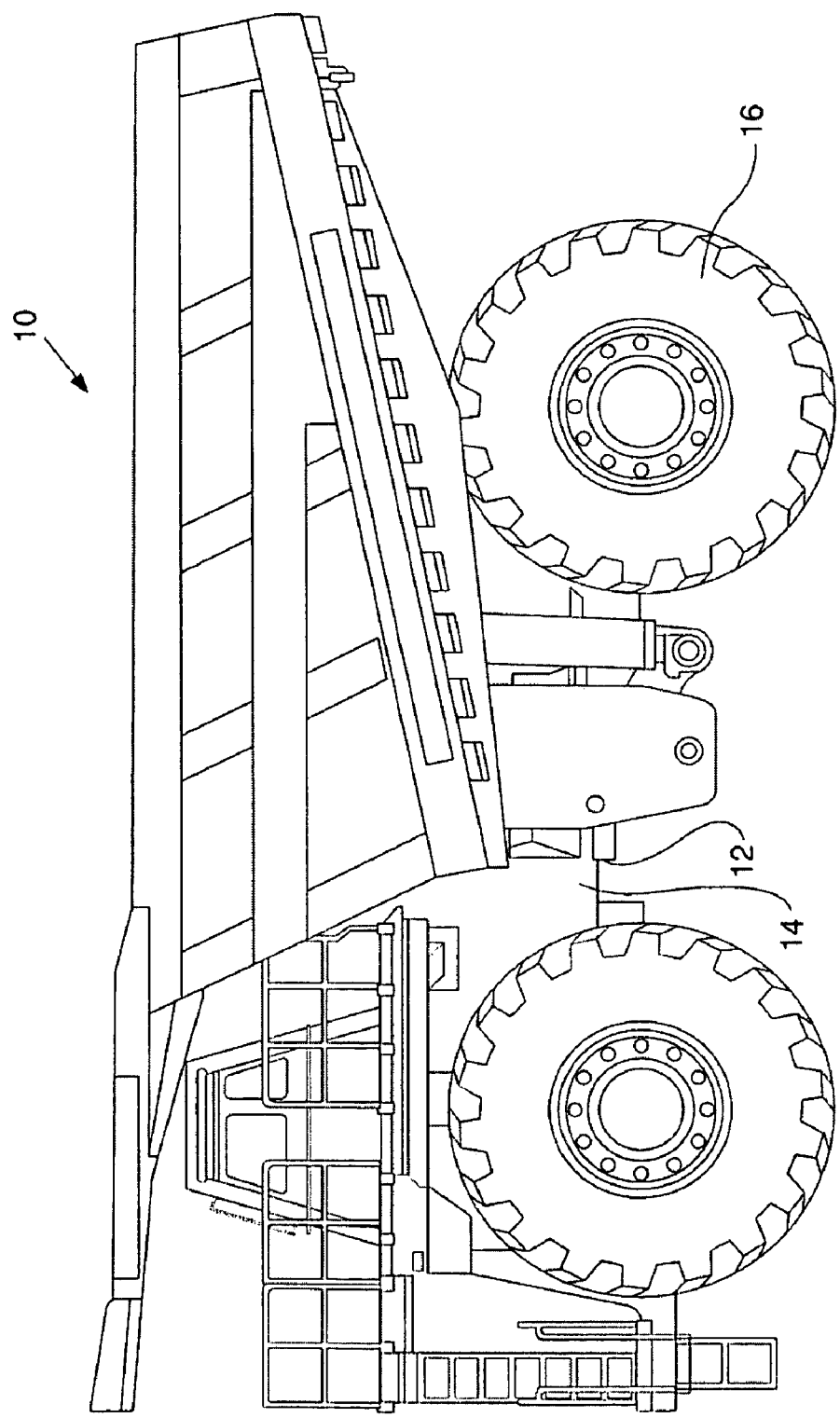
FIG. 1 is a side diagrammatic view of a machine, according to the present disclosure.

An exemplary embodiment of a machine 10 is shown generally in FIG. 1. The machine 10 may be a mining truck, as shown, or any other off-highway or on-highway vehicle. The machine 10 may have a propulsion system such as a mechanical, hydraulic, or electric drive system; in the exemplary embodiment the machine 10 has an electric drive propulsion system. As such, machine 10 may also be referenced herein as an electric drive machine or, more specifically, an electric drive off-highway truck. In the illustrated embodiment, machine 10 generally includes a frame 12 having an electric drive propulsion system 14 supported thereon for driving wheels of the machine 10, such as, for example, rear wheels 16 (only one of which is shown). Electric drive propulsion systems, such as electric drive propulsion system 14, are generally known and, therefore, the entire system will not be described herein in detail.

One skilled in the art, however, should appreciate that an exemplary electric drive propulsion system, such as electric drive propulsion system 14, may include an internal combustion engine, such as, for example, a compression or spark-ignited engine, that provides power to an alternator, or other electrical power generator. The alternator may produce electrical power sufficient to power one or more electric drive motors that, in turn, power rear wheels 16 to propel the machine 10.

Figure 2:
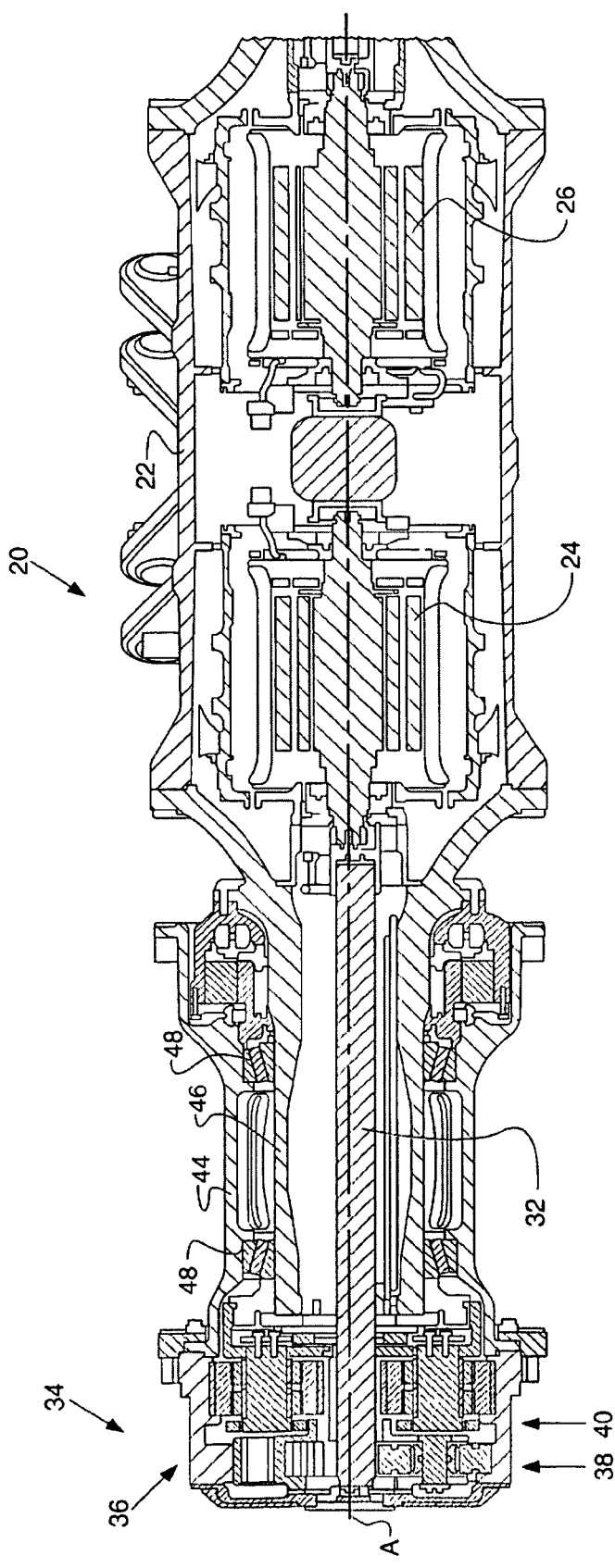
FIG. 2 is a side diagrammatic view, in cross section, of a rear axle assembly of the machine of FIG. 1.
Figure 3:
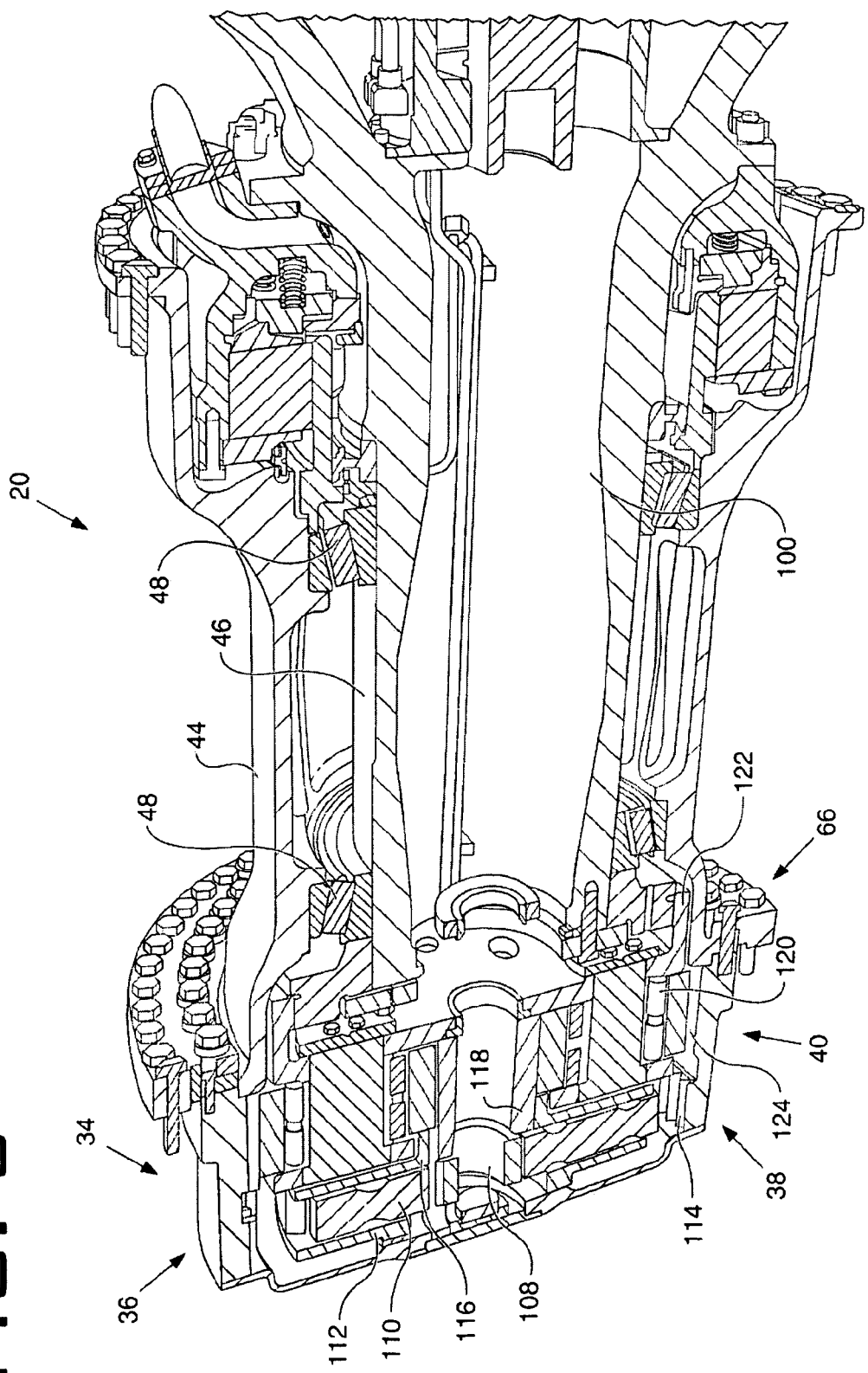
FIG. 3 is a perspective diagrammatic view, in cross section, of the rear axle assembly of FIG. 2.

Turning now to FIGS. 2 and 3, an axle assembly 20, such as a rear axle assembly, may be attached to the frame 12 of machine 10 using any known attachment means, and may support wheels, such as the rear wheels 16 shown in FIG. 1. The axle assembly 20 may include a central axle housing 22 that may include the attachment means (e.g., fasteners) to the machine frame 12. A pair of opposed electric drive motors 24 and 26 of the electric drive propulsion system 14 may be oriented along an axis, such as a substantially horizontal axis A, and may be disposed within the central axle housing 22.

Electric drive motor 24 may be operatively connected to an axle shaft 32. Specifically, the electric drive motor 24 may be configured to drive the axle shaft 32, which, in turn, may be configured to drive a final drive assembly 34. The final drive assembly 34 may, for example, include a double reduction planetary gear set 36, discussed below in greater detail, which includes a first reduction planetary gear set 38 and a second reduction planetary gear set 40. As shown in the illustrated embodiment, the first reduction planetary gear set 38 may be positioned outward of the second reduction planetary gear set 40 and may be directly driven by the axle shaft 32. The first reduction planetary gear set 38 may, in turn, drive the second reduction planetary gear set 40.

The final drive assembly 34 or, more specifically, the second reduction planetary gear set 40, may be configured to rotate a wheel assembly 44. The wheel assembly 44 may be positioned between the central axle housing 22 and the final drive assembly 34, and may be configured to support wheels, such as the rear wheels 16 of FIG. 1. It should be appreciated that wheel assembly 44 may be configured to support one wheel or, alternatively, a pair of wheels, as is known in the art. The wheel assembly 44 may be rotatably supported on a spindle assembly 46 extending from the central axle housing 22. According to one embodiment, the wheel assembly 44 may be rotatably mounted on the spindle assembly 46 using known wheel or roller bearings 48.

According to a specific example, the first reduction planetary gear set 38 may include a sun gear 108 that may be driven by the axle shaft 32 (shown removed in FIG. 3). As the sun gear 108 rotates, it may drivingly engage a set of planetary gears 110, supported by a carrier 112, and in meshed engagement with a ring gear 114. The carrier 112 may be rotatable about axis A, as illustrated in FIGS. 2 and 4, and the ring gear 114 may be attached to the wheel assembly 44, as shown.

As the planetary gears 110 and the carrier 112 rotate, a splined engagement feature 116 extending from the carrier 112 may drivingly engage a sun gear 118 of the second reduction planetary gear set 40. The sun gear 118 of the second reduction planetary gear set 40, in turn, may drive a set of planetary gears 120, supported by a carrier 122. As shown, the carrier 122 may be attached to the spindle assembly 46 and, as such, may remain relatively stationary. It should be appreciated, therefore, that driving engagement of the planetary gears 120, supported within the relatively stationary housing 122, may drive a ring gear 124 of the second reduction planetary gear set 40 and, as a result, rotate the wheel assembly 44 attached thereto.

It should be appreciated that the axle assembly 20 may include an internal axle cavity 100, or lubrication chamber, defined by the spindle assembly 46 and the final drive assembly 34, as shown in FIG. 3. The internal axle cavity 100 may contain a supply of lubricant, such as a sump or oil bath, for lubricating components of the axle assembly 20, such as gears and bearings, and dissipating heat therefrom. According to one example, the first reduction planetary gear set 38 and the second reduction planetary gear set 40 may be partially submerged in an oil bath. In a specific example, roughly one-third of the heights of the respective carriers 112, 122 are submerged in oil when the machine 10 is stationary.

Figure 4:
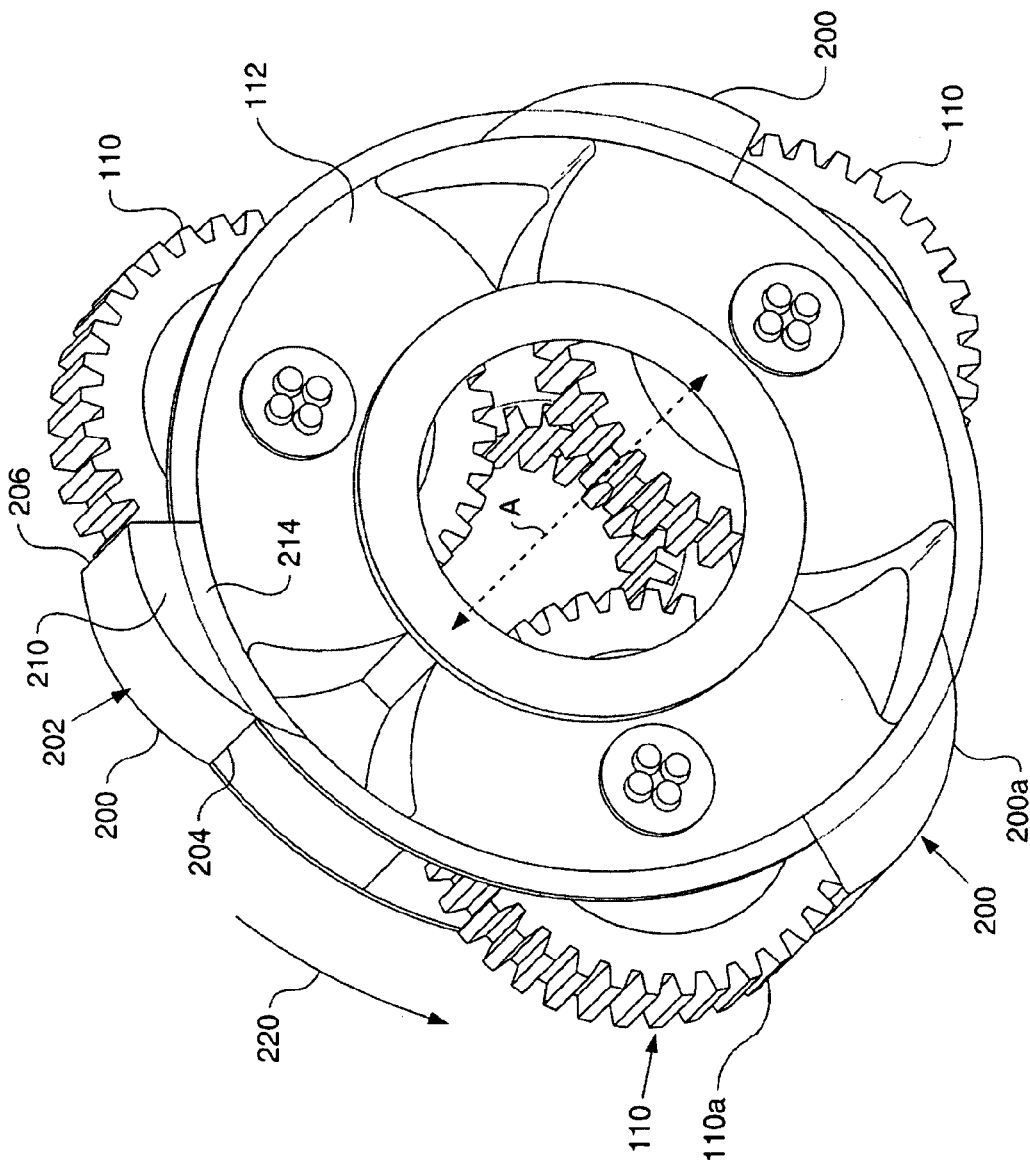
FIG. 4 is a perspective diagrammatic view of a first stage reduction planetary gear assembly of the rear axle assembly of FIG. 2.
Figure 5:
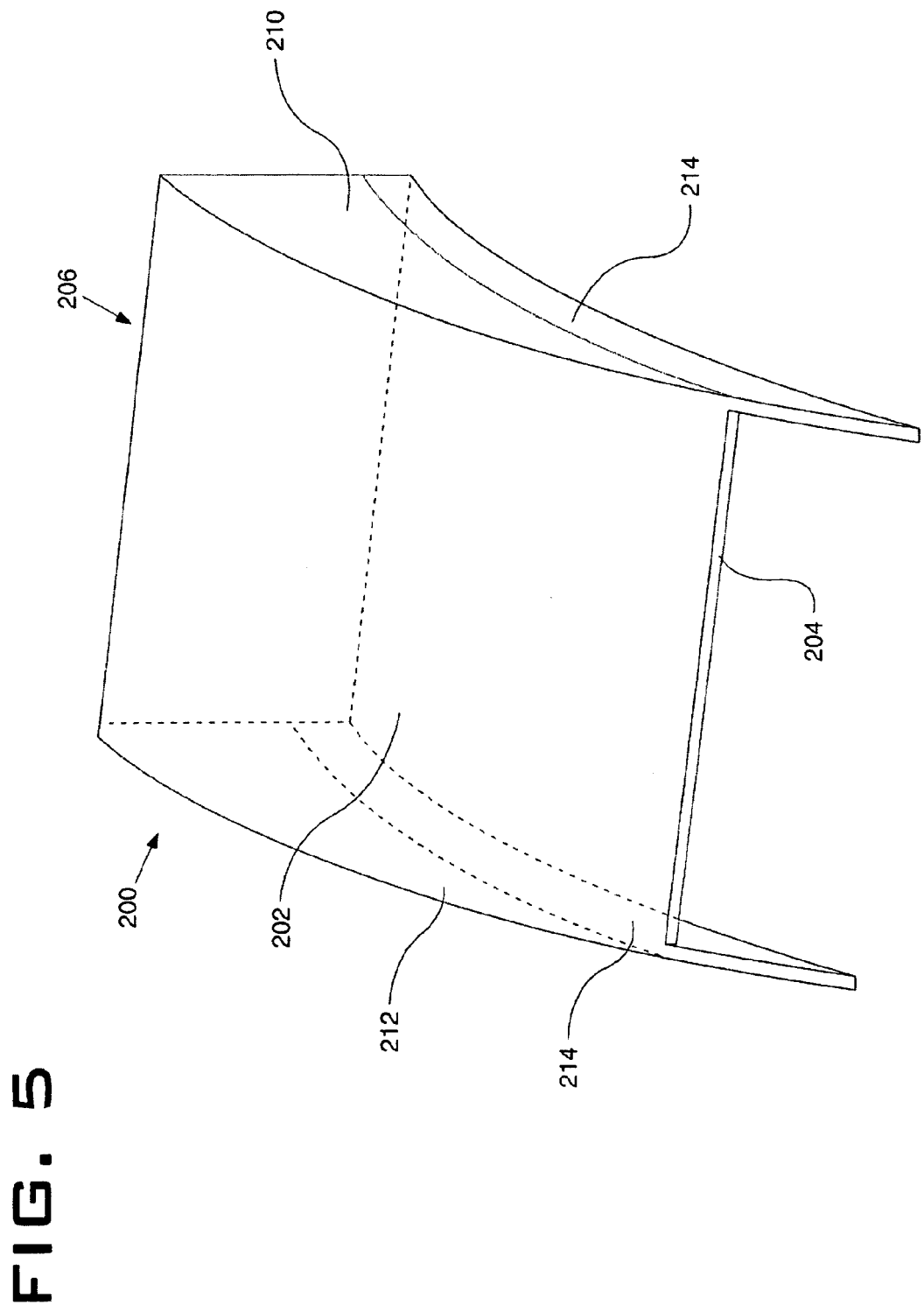
FIG. 5 is a perspective diagrammatic view of a sheath, according to the present disclosure.

Turning now to FIGS. 4 and 5, the first reduction planetary gear set 38 may include a plurality of sheaths 200 partially covering each of the planetary gears 110 in the first reduction planetary gear set 38. Each sheath 200 may cover a portion of a respective planetary gear 110, for example, sheath 200a has a respective planetary gear 110a. As illustrated, each of the sheaths 200 are coupled to the carrier 112 and have an outer surface 202 with a first end 204 proximate to the carrier 112 and away from the planetary gear 110, and a second end 206 proximate to the planetary gear 110 and away from the carrier 112. According to one embodiment, the first end 204 may be substantially flush with the carrier 112. Furthermore, an inner surface of the sheaths 200 may form an envelope that partially encloses a portion their respective planetary gears 110.

As seen most clearly in FIG. 5, each sheath 200 may be constructed of a first member forming a first sidewall 210, a second member forming a second sidewall 212 and a third member defining the outer surface 202; the first, second and third members may be joined together by any means known in the art, such as, for example, by welding. The first sidewall 210 and the second sidewall 212 may be substantially perpendicular to the carrier's 112 axis of rotation A and may support the third member. The first sidewall 210 and the second sidewall 212 may also include a mounting portion 214 to facilitate mounting the sheath 200 to the carrier 212, such as by way of bolts, welds, or any other attachment means known in the art. As illustrated in FIG. 5, the third member may be constructed of a curved plate, such that the outer surface 202 is curved, which is to say a cross section of the outer surface 202, taken along a plane perpendicular to the carrier's axis of rotation A, may substantially form an arc.

Alternatively, each sheath 200 may be constructed differently than described above, such as, for example, by forming a single piece of metal into the general shape of the sheaths 200 illustrated in FIGS. 4 and 5. Such sheaths 200 may have some differences in shape; for example, a cross section of such a sheath 200, taken along a plane that contains the carrier's axis of rotation A, may form a substantially continuous arc. According to yet another embodiment the sheaths 200 may also be integrally formed with the carrier 112, such as by casting the sheath 200 into the circumference of the carrier 112.

The illustrated carrier 112 has a primary direction of rotation 220, as illustrated in FIG. 4, which refers to the direction that the carrier 112 rotates when the machine 10 moves forward. As the carrier 112 rotates in the primary direction of rotation 220, each sheath 200 enters the oil bath before its respective planetary gear 110. Each sheath 200 preferably has a hydrodynamic profile, which is to say a profile that reduces turbulence generated in the oil bath as each sheath 200 and respective planetary gear 110 enters the oil bath, such as, for example, the profile of the sheaths 200 described above and illustrated in FIGS. 4 and 5.

Figure 6:
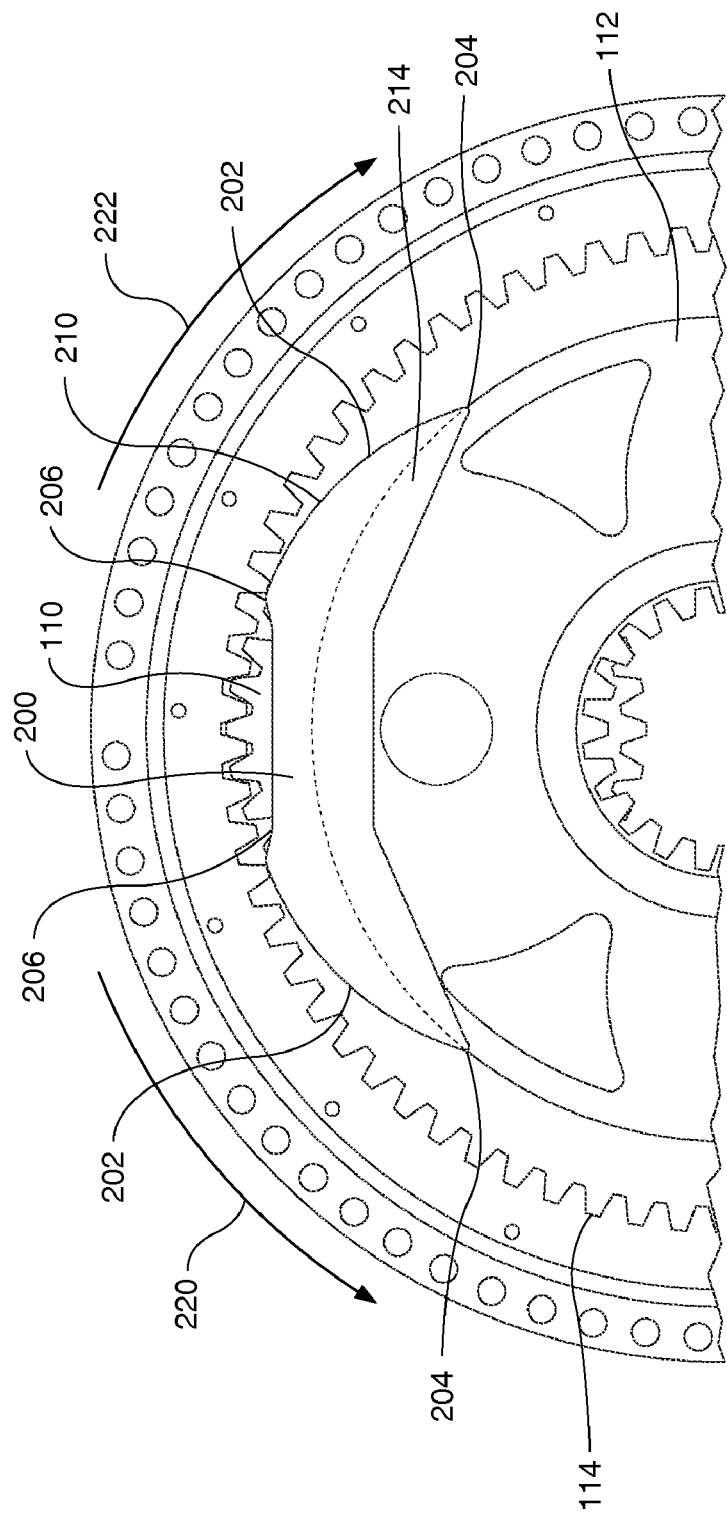
FIG. 6 is a diagrammatic view of another embodiment of a first stage reduction planetary gear assembly.

FIG. 6 illustrates another embodiment of a sheath 200. According to this embodiment, the sheath 200 spans the planetary gear 100 and includes outer surfaces 202 on both sides of the planetary gear 110, each outer surface 202 having its own first end 204 and second end 206. According to this embodiment, the sheath 200 may reduce turbulence generated in the oil bath when the carrier 112 is rotating in both the primary direction 220 and a secondary direction of rotation 222, the secondary direction of rotation 222 being opposite to the primary direction of rotation 220.

INDUSTRIAL APPLICABILITY

In operation, an electric drive machine, such as, for example, the machine 10 disclosed herein, will provide electric power to one or more electric drive motors 24, 26, which will, in turn, rotate an axle shaft 32. The axle shaft 32 may then, in turn, rotate the sun gear 108 of the first reduction planetary gear set 38, ultimately causing the carrier 112 to rotate. Under normal operating conditions, the carrier 112 may rotate at speeds up to or exceeding five hundred rotations per minute.

It should be understood that during operation of the machine 10, the machine 10 may be commanded to move forward and the carrier 112 will rotate in the primary direction of rotation 220. As this occurs a given planetary gear 110 may cyclically enter and exit the oil bath. As the planetary gear 110 enters the oil bath, the sheath 200 leads the planetary gear 110 into the oil bath. Due to its hydrodynamic profile, the sheath 200 reduces the turbulence and/or churning created by this entry of the planetary gear 110. Due to the high rotational speed of the carrier 112 the reduction of turbulence and/or churning may result in significantly less energy wasted and less heat generated.

It will be apparent to those skilled in the art that various modifications and variations can be made to the disclosed final drive assembly 34 without departing from the scope or spirit of the disclosure. Additionally, other embodiments of the disclosed final drive assembly 34 will be apparent to those skilled in the art from consideration of the specification and practice of the apparatus and method disclosed herein. It is intended that the specification and examples be considered as exemplary only.

What is claimed is:

1. A gear train assembly that is lubricated by oil, comprising:
 a carrier rotatable about an axis,
 a planetary gear rotatably coupled to the carrier, and
 a sheath coupled to the carrier, the sheath having a first sidewall, a second sidewall spaced apart from the first sidewall, and an outer surface positioned between the first sidewall and the second sidewall, the first sidewall being disposed on a first side of the planetary gear, the second sidewall being disposed on a second side of the planetary gear, the sheath thereby partially enclosing a portion of the planetary gear,
 wherein the outer surface has a first end disposed proximate to the carrier and away from the planetary gear, and a second end disposed proximate to the planetary gear and away from the carrier.

2. The gear train assembly of claim 1, wherein the first end is substantially flush with the carrier.

3. The gear train assembly of claim 1, wherein the carrier has a primary direction of rotation, and the first end leads the second end as the carrier rotates in the primary direction of rotation.

4. The gear train assembly of claim 3, wherein a cross-section of the outer surface taken along a plane perpendicular to the axis substantially forms an arc.

5. The gear train assembly of claim 1, wherein the sheath comprises a first member forming the first sidewall, a second member forming the second sidewall and a third member defining the outer surface.

6. The gear train assembly of claim 5, wherein the first member and the second member are coupled to the carrier and support the third member.

7. The gear train assembly of claim 6, wherein the third member is a curved plate.

8. The gear train assembly of claim 7, wherein the first member and the second member are substantially perpendicular to the axis.

9. The gear train assembly of claim 1, wherein the carrier is partially submerged in an oil bath.

10. The gear train assembly of claim 1 wherein the sheath has a hydrodynamic profile.

11. The gear train assembly of claim 9 wherein the carrier is oriented such that the axis extends along a substantially horizontal direction.

12. The gear train assembly of claim 1 further comprising,
 a second planetary gear rotatably coupled to the carrier and engaged with the ring gear, and
 a second sheath coupled to the carrier and partially enclosing a portion of the second planetary gear, the second sheath having a second outer surface,
 a third planetary gear rotatably coupled to the carrier and engaged with the ring gear, and
 a third sheath coupled to the carrier and partially enclosing a portion of the third planetary gear, the third sheath having a third outer surface.

13. A sheath for mounting on a carrier of a planetary gear set having a planetary gear, the carrier being rotatable about an axis, the sheath comprising:
 a mounting surface adapted for attachment to the carrier,
 a member having an inner surface and a substantially curvilinear outer surface, the outer surface having a first end adapted to be situated proximate to the carrier and away from the planetary gear when the sheath is mounted, and a second end adapted to be situated proximate to the planetary gear and away from the carrier when the sheath is mounted,
 a first sidewall and a second sidewall spaced apart from the first sidewall, wherein the member is positioned between the first sidewall and the second sidewall, and
 an envelope at least partially defined by the first sidewall, the second sidewall, and the inner surface and adapted to partially enclose the planetary gear when the sheath is mounted.

14. The sheath of claim 13, wherein the sheath has a hydrodynamic profile.

15. The sheath of claim 14, wherein the first end is adapted to be substantially flush with the carrier.

16. The sheath of claim 13 wherein the first sidewall and the second sidewall are coupled to each of the mounting surface and the member, and the first sidewall and the second sidewall are substantially perpendicular with respect to the axis.

17. A method of reducing turbulence generated by a planetary gear set partially submerged in an oil bath, the method comprising the steps:
 providing a carrier rotatable in a primary direction about an axis,
 providing a plurality of planetary gears rotatably coupled to the carrier,
 providing a plurality of sheaths coupled to the carrier, each sheath having a first sidewall, a second sidewall spaced apart from the first sidewall, and an outer surface positioned between the first sidewall and the second sidewall, each sheath partially enclosing one of the plurality of planetary gears, the first sidewall of each sheath being disposed on a first side of each of the plurality of planetary gears and the second sidewall of each sheath being disposed on a second side of each of the plurality of planetary gears, and
 rotating the carrier in the primary direction,
 wherein as the carrier rotates in the primary direction, for each full rotation of the carrier, each sheath leads its respective planetary gear into the oil bath.

18. The method of claim 17, wherein the sheath has a hydrodynamic profile.

19. The method of claim 17, wherein each of the plurality of sheaths has an outer surface having a first end disposed proximate to the carrier and away from the respective planetary gear, and a second end disposed proximate to the respective planetary gear and away from the carrier.

20. The method of claim 19, wherein the first end is substantially flush with the carrier.

* * * * *